United States Patent
Nishikawa et al.

(10) Patent No.: US 12,503,747 B2
(45) Date of Patent: Dec. 23, 2025

(54) METHOD FOR SEPARATING LITHIUM

(71) Applicant: DOWA ECO-SYSTEM CO., LTD., Tokyo (JP)

(72) Inventors: Chihiro Nishikawa, Tokyo (JP); Yoshihiro Honma, Tokyo (JP); Ryoei Watanabe, Tokyo (JP)

(73) Assignee: DOWA ECO-SYSTEM CO., LTD., Tokyo (JP)

( * ) Notice: Subject to any disclaimer, the term of this patent is extended or adjusted under 35 U.S.C. 154(b) by 675 days.

(21) Appl. No.: 17/772,041

(22) PCT Filed: Sep. 10, 2020

(86) PCT No.: PCT/JP2020/034206
§ 371 (c)(1),
(2) Date: Apr. 26, 2022

(87) PCT Pub. No.: WO2021/090571
PCT Pub. Date: May 14, 2021

(65) Prior Publication Data
US 2022/0396852 A1 Dec. 15, 2022

(30) Foreign Application Priority Data
Nov. 8, 2019 (JP) .................................. 2019-203323

(51) Int. Cl.
*C22B 26/12* (2006.01)
*C22B 3/06* (2006.01)
(Continued)

(52) U.S. Cl.
CPC ................ *C22B 26/12* (2013.01); *C22B 3/06* (2013.01); *C22B 3/22* (2013.01); *C22B 3/44* (2013.01);
(Continued)

(58) Field of Classification Search
CPC .. C22B 26/12; C22B 3/06; C22B 1/02; C22B 3/04; C22B 7/005; C22B 7/006;
(Continued)

(56) References Cited

U.S. PATENT DOCUMENTS 9,677,152 B2 * 6/2017 Asano ................ H01M 10/052
2014/0377154 A1 12/2014 Ishida et al.
2019/0153563 A1 5/2019 Liu et al.

FOREIGN PATENT DOCUMENTS

CN     108002410 A     5/2018
JP     H06346160 A * 12/1994
(Continued)

OTHER PUBLICATIONS

Dahui Wang, Separation of Li and Co from the active mass of spent Li-ion batteries by selective sulfating roasting with sodium bisulfate and water leaching, Minerals Engineering, vol. 126, pp. 28-35 (Year: 2018).*

(Continued)

*Primary Examiner* — Anthony J Zimmer
*Assistant Examiner* — Jaanzeb C Raja
(74) *Attorney, Agent, or Firm* — GREENBLUM & BERNSTEIN, P.L.C.

(57) ABSTRACT

Provided is a method for separating lithium from a lithium solution containing lithium by 200 mg/L or more and fluorine by 20 mg/L or more, the method including: a first removal step of adding a first component, which solidifies the fluorine contained in the lithium solution, to the lithium solution and removing the fluorine solidified to obtain a F-removed liquid; and a second removal step of adding a second component, which solidifies the first component remaining in the F-removed liquid, to the F-removed liquid and removing the first component solidified to obtain a first component-removed liquid.

23 Claims, 2 Drawing Sheets

(51) Int. Cl.
  *C22B 3/22* (2006.01)
  *C22B 3/44* (2006.01)
  *H01M 10/0525* (2010.01)
  *H01M 10/54* (2006.01)

(52) U.S. Cl.
  CPC ........ *H01M 10/54* (2013.01); *H01M 10/0525* (2013.01)

(58) Field of Classification Search
  CPC .. H01M 10/54; H01M 10/0525; Y02W 30/84; B09B 3/00
  See application file for complete search history.

(56) References Cited

FOREIGN PATENT DOCUMENTS

| | | |
|---|---|---|
| JP | 2004-11010 A | 1/2004 |
| JP | 2011-94227 A | 5/2011 |
| JP | 2011-94228 A | 5/2011 |
| JP | 2012-36419 A | 2/2012 |
| JP | 2012-72464 A | 4/2012 |
| JP | 2012-229471 A | 11/2012 |
| JP | 2012-229481 A | 11/2012 |
| JP | 5791917 B2 | 10/2015 |
| JP | 2016-3382 A | 1/2016 |
| JP | 2017147241 A * | 8/2017 |
| JP | 2018-145473 A | 9/2018 |
| JP | 2019-178395 A | 10/2019 |
| WO | 2013/114621 A1 | 8/2013 |
| WO | WO-2018076994 A1 * | 5/2018 ............. C01D 15/02 |

OTHER PUBLICATIONS

Rajeev Agnihotri, Influence of Surface Modifiers on the Structure of Precipitated Calcium Carbonate Industrial & Engineering Chemistry Research 1999 38 (6), 2283-2291 DOI: 10.1021/ie9900521 (Year: 1999).*

Office Action issued in the corresponding Chinese patent application No. 202080077263.6 dated Sep. 1, 2023.

International Search Report issued in International Patent Application No. PCT/JP2020/034206, dated Nov. 10, 2020, along with an English translation thereof.

Written Opinion of the International Searching Authority issued in International Application No. PCT/JP2020/034206, dated Nov. 10, 2020.

Notice of Reasons for Refusal (Office Action) in Japanese Patent Appl. No. 2020-555540, dated Dec. 1, 2020, along with an English translation thereof.

* cited by examiner

METHOD FOR SEPARATING LITHIUM

TECHNICAL FIELD

The present invention relates to a method for separating lithium.

BACKGROUND ART

Lithium ion secondary batteries are secondary batteries that are lighter in weight, higher in capacity, and higher in electromotive force than, for example, existing lead storage batteries and nickel-cadmium secondary batteries. Such lithium ion secondary batteries have been used as secondary batteries in, for example, personal computers, electric vehicles, and mobile phones. Positive electrodes of the lithium ion secondary batteries use valuable substances such as cobalt and nickel in the form of, for example, lithium cobalt oxide ($LiCoO_2$) and ternary positive electrode materials ($LiNi_xCo_yMn_zO_2$ (x+y+z=1)).

The lithium ion secondary batteries are expected to find more applications in the future. It is desirable from the viewpoint of recycling resources to recover valuable substances such as lithium from defective products occurring in the course of production and lithium ion secondary batteries to be discarded due to, for example, exhausted lifetimes thereof and of devices in which they are being used. When recovering such valuable substances as lithium from the lithium ion secondary batteries, it is important for recovery to separate various metals and impurities used in the lithium ion secondary batteries, in terms of increasing the value of substances recovered. Especially when using as a battery material the lithium carbonate that has been recovered from waste batteries of the lithium ion secondary batteries, a large amount of impurities contained in the lithium carbonate impair electrical characteristics. Thus, lithium carbonate of a high purity with less impurities has been demanded.

An exemplary proposed technique of recovering lithium carbonate while preventing inclusion of impurities from lithium ion secondary batteries is recovering lithium from incinerated ash occurring when incinerating positive electrode active materials of lithium ion secondary batteries containing complex oxides containing lithium and transition metals including at least cobalt (see, for example, PTL 1). In this technique, for example, while adding an inorganic acid to a treatment liquid, which has been prepared by adding incinerated ash to water, so as to have a pH of from 3 to 10, water-soluble lithium in the incinerated ash is leached to water, followed by solid-liquid separation. Addition of the incinerated ash to the resultant leached liquid is repeated. A carbonating agent is added to the treatment liquid having the increased lithium concentration to recover lithium as a lithium carbonate salt.

Another exemplary proposed technique of recovering lithium carbonate from lithium ion secondary batteries with high purity is storing a solution containing lithium ions and carbonate ions in a crystallizing tank in which a positive electrode and a negative electrode are disposed, and applying current to the solution containing lithium ions and carbonate ions to precipitate lithium carbonate on or around the negative electrode (see, for example, PTL 2).

Another exemplary proposed technique of recovering lithium free of impurities, such as phosphorus and fluorine, from lithium ion secondary batteries is adding an alkali to a lithium-containing liquid and contacting an acid solvent extraction liquid with the resultant to extract lithium ions, followed by contacting the acid solvent extraction liquid with an acid solution to back-extract lithium ions (see, for example, PTL 3).

The above-described existing techniques, however, have potential disadvantages such as an insufficient recovery rate of lithium, a cost increase due to complicated steps for removing impurities such as fluorine, and an increase in the concentration of impurities in lithium which are also concentrated and recovered when concentrating lithium.

CITATION LIST

Patent Literature

PTL 1: Japanese Patent No. 5791917
PTL 2: Japanese Patent No. 5872788
PTL 3: International Publication No. WO2013-114621

SUMMARY OF INVENTION

Technical Problem

The present invention aims to solve the problems existing in the art and achieve the following object. Specifically, the present invention has an object to provide a method for separating lithium where the method can separate lithium and fluorine, which is an impurity, from a lithium solution in a simple manner and with high separation performance.

Solution to Problem

Means for achieving the above object are as follows.

<1> A method for separating lithium from a lithium solution containing lithium by 200 mg/L or more and fluorine by 20 mg/L or more, the method including:

adding a first component, which solidifies the fluorine contained in the lithium solution, to the lithium solution and removing the fluorine solidified to obtain a F-removed liquid; and adding a second component, which solidifies the first component remaining in the F-removed liquid, to the F-removed liquid and removing the first component solidified to obtain a first component-removed liquid.

<2> The method for separating lithium according to <1> above, wherein a pH of the lithium solution is 10.5 or higher but 12.5 or lower.

<3> The method for separating lithium according to <1> or <2> above, wherein the first component is a calcium compound.

<4> The method for separating lithium according to any one of <1> to <3> above, wherein the first component is calcium hydroxide.

<5> The method for separating lithium according to any one of <1> to <4> above, wherein the second component is carbon dioxide.

<6> The method for separating lithium according to any one of <1> to <5> above, wherein in the adding the second component, a carbon dioxide gas is added to the F-removed liquid as the second component.

<7> The method for separating lithium according to any one of <1> to <6> above, wherein a pH of the F-removed liquid is 12 or higher.

<8> The method for separating lithium according to any one of <1> to <7> above, further including treating a lithium ion secondary battery to obtain the lithium solution.

<9> The method for separating lithium according to <8> above, wherein in the treating the lithium ion secondary battery, a thermal treatment of heating the lithium ion secondary battery is performed and then the lithium contained in the lithium ion secondary battery is allowed to leach into water to obtain the lithium solution.

<10> The method for separating lithium according to <9> above, wherein a temperature in the thermal treatment of the lithium ion secondary battery is 750° C. or higher.

<11> The method for separating lithium according to <9> or <10> above, wherein pulverizing a thermally treated product of the lithium ion secondary battery is followed by subjecting a minutely granulated product to leaching with water, where the minutely granulated product is recovered through classification in a range of 0.6 mm or more but 2.4 mm or less.

<12> The method for separating lithium according to any one of <8> to <11> above, wherein the lithium ion secondary battery contains at least one selected from the group consisting of cobalt, nickel, and manganese.

<13> The method for separating lithium according to any one of <1> to <12> above, wherein in the adding the first component and the adding the second component, the fluorine solidified and the first component solidified are removed through solid-liquid separation.

<14> The method for separating lithium according to any one of <1> to <13> above, further including after the adding the second component, warming the first component-removed liquid to recover lithium carbonate.

<15> The method for separating lithium according to <14> above, wherein a temperature of the first component-removed liquid during the warming is adjusted to 60° C. or higher.

<16> The method for separating lithium according to <14> or <15> above, wherein in the warming the first component-removed liquid, the first component-removed liquid is subjected to evaporative concentration to recover the lithium carbonate.

<17> The method for separating lithium according to <16> above, wherein a crystallized liquid obtained by recovering the lithium carbonate through the evaporative concentration of the first component-removed liquid is added again to the lithium solution in the adding the first component.

<18> The method for separating lithium according to any one of <3> to <17> above, wherein in the adding the first component, an aluminum compound is added as the first component in addition to the calcium compound.

<19> A method for separating lithium from a lithium solution containing lithium by 200 mg/L or more and fluorine by 20 mg/L or more, the method including:
adding carbon dioxide to the lithium solution to obtain a solution in which carbonate ions are dissolved; and
warming the solution to precipitate lithium carbonate, followed by solid-liquid separation, to separate the lithium.

<20> The method for separating lithium according to <19> above, wherein a pH of the lithium solution is 10.5 or higher.

<21> The method for separating lithium according to <19> or <20> above, wherein a pH of the lithium solution is 12.0 or higher.

<22> The method for separating lithium according to any one of <19> to <21> above, wherein the carbon dioxide is added by bubbling a carbon dioxide gas.

<23> The method for separating lithium according to any one of <19> to <22> above, wherein a temperature of the lithium solution during the warming is 60° C. or higher.

<24> The method for separating lithium according to any one of <19> to <23> above, wherein the lithium carbonate is precipitated through evaporative concentration of the solution in which the carbonate ions are dissolved.

<25> The method for separating lithium according to any one of <19> to <24> above, wherein in the adding the carbon dioxide, a concentration of the carbonate ions in the lithium solution after addition of the carbon dioxide is 3000 mg/L or higher.

<26> The method for separating lithium according to any one of <19> to <25> above, wherein in the adding the carbon dioxide, a concentration of the carbonate ions in the lithium solution after addition of the carbon dioxide is 6000 mg/L or higher.

<27> The method for separating lithium according to any one of <19> to <26> above, further including treating a lithium ion secondary battery containing at least one selected from the group consisting of cobalt, nickel, and manganese, to obtain the lithium solution, wherein the treating the lithium ion secondary battery includes: heating the lithium ion secondary battery at 750° C. or higher; pulverizing a thermally treated product of the lithium ion secondary battery, followed by classification in a range of 0.6 mm or more but 2.4 mm or less; and subjecting a minutely granulated product to leaching with water, where the minutely granulated product is recovered through the classification.

Advantageous Effects of Invention

The present invention can solve the problems existing in the art and achieve the following object. Specifically, the present invention can provide a method for separating lithium where the method can separate lithium and fluorine, which is an impurity, from a lithium solution in a simple manner and with high separation performance.

DESCRIPTION OF EMBODIMENTS (Method for Separating Lithium)

The method for separating lithium of the present invention is a method for separating lithium from a lithium solution containing lithium by 200 mg/L or more and fluorine by 20 mg/L or more, where the method includes a first removal step and a second removal step, preferably includes a lithium solution preparation step, a lithium concentration step, and a lithium recovery step, and if necessary, includes other steps.

The method for separating lithium of the present invention is based on the finding obtained by the present inventors; i.e., the fact that the existing art cannot separate lithium and fluorine from a lithium solution in some cases and the separation performance of lithium and fluorine may be insufficient. The method for separating lithium of the present invention is also based on the finding obtained by the present inventors; i.e., the fact that the existing art may involve a complicated separation treatment for separating lithium and fluorine and the cost for performing this separation treatment may become higher.

For example, when the separation performance of lithium and fluorine from a lithium solution is insufficient, a larger amount of fluorine is contained in lithium carbonate when recovering lithium as the lithium carbonate from the lithium solution. This raises a problem that electrical properties degrade when the lithium carbonate is used as a battery material. Another problem is that when the existing art is used to separate lithium and fluorine from a lithium solution, the recovery rate of lithium may become lower when recovering lithium from the lithium solution.

More specifically, for example, the technique disclosed in PTL 1 requires to appropriately adjusting the pH (hydrogen-ion exponent) of the solution when leaching lithium to the solution. This complicates a step of leaching lithium and a step of removing impurities. In the technique disclosed in PTL 1, repeating leaching of lithium to the solution to increase the concentration of lithium in the solution also increases the concentration of fluorine that is an impurity, which may lead to a decrease in the purity (content) of the lithium carbonate recovered. These are the findings obtained by the present inventors.

Also, for example, the technique disclosed in PTL 2 uses electrophoresis as a method of removing impurities such as fluorine. However, the step of performing electrophoresis is not only complicated but also expensive, which is problematic. Moreover, when the present inventors replicated the technique disclosed in PTL 2, the recovery rate of lithium from the lithium solution after the electrophoresis was about 50%. The rest 50% was distributed to the side of an impurity-concentrated liquid containing fluorine at a high concentration. Recovering lithium again from this liquid through electrophoresis requires additional cost, which is an obstacle in recovering lithium. The present inventors found it difficult to increase the recovery rate of lithium to 50% or higher.

In addition, for example, the technique disclosed in PTL 3 requires to perform a back extraction step of back-extracting lithium ions after extraction of the lithium ions. Performing the back extraction step is not only complicated but also expensive, which is problematic.

As discussed above, the present inventors found out the problems in the existing art: the separation performance of lithium and fluorine from a lithium solution may be insufficient; and the separation treatment for separating lithium and fluorine is complicated and the cost for performing the separation treatment may become higher.

Under such circumstances, the present inventors conducted intensive studies on, and have conceived a method for separating lithium that can separate lithium and fluorine, which is an impurity, from a lithium solution in a simple manner and with high separation performance.

Specifically, the present inventors have found that lithium and fluorine, which is an impurity, can be separated from a lithium solution in a simple manner and with high separation performance by a method for separating lithium from a lithium solution containing lithium by 200 mg/L or more and fluorine by 20 mg/L or more, the method including: a first removal step of adding a first component, which solidifies the fluorine contained in the lithium solution, to the lithium solution and removing the fluorine solidified to obtain a F-removed liquid; and a second removal step of adding a second component, which solidifies the first component remaining in the F-removed liquid, to the F-removed liquid and removing the first component solidified to obtain a first component-removed liquid.

Also, the present inventors have found that lithium and fluorine, which is an impurity, can be separated in a simple manner and with high separation performance by a method for separating lithium from a lithium solution containing lithium by 200 mg/L or more and fluorine by 20 mg/L or more, the method including: a step of adding carbon dioxide to the lithium solution to obtain a solution in which carbonate ions are dissolved; and a step of warming the solution to precipitate lithium carbonate, followed by solid-liquid separation, to separate the lithium.

In the method for separating lithium of the present invention, in the first removal step, the first component, which solidifies the fluorine contained in the lithium solution, is added to the lithium solution and the fluorine solidified is removed to obtain a F-removed liquid. In other words, in the first removal step, the fluorine contained in the lithium solution is bonded to the first component to form a fluorine compound (fluoride) between the fluorine and the first component, and the fluorine is solidified, which makes it possible to remove the fluorine in the lithium solution. In one exemplary preferable embodiment of the method for separating lithium of the present invention, for example, the lithium solution is subjected to solid-liquid separation to remove the fluorine solidified (fluorine compound) from the lithium solution.

The first component added in the first removal step (when the first component is initially contained in the lithium solution, the first component added in the first removal step includes the initially contained first component as well) may become an impurity when separating or recovering the lithium. In the present invention, therefore, the second removal step is performed to remove the first component from the lithium solution (the F-removed liquid).

In the second removal step, the second component, which solidifies the first component remaining in the lithium solution (the F-removed liquid), is added to the lithium solution (the F-removed liquid) and the solidified first component is removed to obtain a first component-removed liquid. In other words, in the second removal step, the first component remaining in the lithium solution (the F-removed liquid) is bonded to the second component to form a bonded product between the first component and the second component, and the first component is solidified, which makes it possible to remove the first component remaining in the lithium solution. For example, when carbon dioxide is used as the second component, the first component can be solidified as a carbonate salt of the first component. In one exemplary preferable embodiment of the method for separating lithium of the present invention, for example, the lithium solution is subjected to solid-liquid separation to remove the solidified first component from the lithium solution.

As described above, in the present invention, the first removal step and the second removal step can be performed to separate lithium and fluorine, which is an impurity, from the lithium solution in a simple manner and with high separation performance.

In the present invention, as described above, lithium and fluorine, which is an impurity, can be separated in a simple manner and with high separation performance by performing a step of adding carbon dioxide to the lithium solution to obtain a solution in which carbonate ions are dissolved and a step of warming the solution to precipitate lithium carbonate, followed by solid-liquid separation, to separate the lithium.

More specifically, for example, when adding carbon dioxide and an alkali to the lithium solution obtained by treating the lithium ion secondary battery and then warming the resultant mixture, the lithium carbonate precipitates more easily even if the fluorine is not removed from the lithium solution. The lithium carbonate precipitates preferentially to lithium fluoride, which makes it possible to obtain the lithium carbonate of a high purity (content) with less fluorine.

The above alkali is added for the purposes of, for example, preventing the pH from decreasing by the addition of carbon dioxide. The decreased pH leads to a decreased amount of carbon dioxide dissolved. This may decrease the amount of the below-described lithium carbonate that precipitates. The above alkali is preferably one free from a component that forms a solid with carbon dioxide (e.g., calcium), and examples thereof include sodium hydroxide and potassium hydroxide.

Details of this embodiment will be described below as a second embodiment.

The method for separating lithium of the present invention can be particularly suitably used when, for example, recovering lithium from used lithium ion secondary batteries to be discarded. By using the method for separating lithium of the present invention to recover lithium from the lithium solution in which lithium and fluorine are separated from each other, it is possible to obtain lithium of a high purity (content) with less fluorine. More specifically, in one preferable example of the present invention, since a positive electrode material and an electrolyte each containing lithium are covered with a casing member of a secondary battery, the interior of the secondary battery in the thermal treatment easily becomes in a reduced state by carbon derived from a negative electrode active material. Under the thermal treatment conditions, lithium in $Li(Ni/Co/Mn)O_2$ contained in the positive electrode active material and in $LiPF_6$ contained in the electrolyte can be formed into a substance containing lithium that is soluble in an aqueous solution, such as lithium fluoride (LiF), lithium carbonate ($Li_2CO_3$), and lithium oxide ($Li_2O$). This makes it possible to separate lithium from impurities other than fluorine at the time of leaching.

For the above-described reason, the lithium carbonate of a high purity (content) with less fluorine can be obtained in a simple manner by separating lithium and fluorine from the lithium solution obtained by treating the lithium ion secondary battery and recovering lithium as lithium carbonate from the lithium solution after the separation.

The method for separating lithium of the present invention is a method for separating lithium from a lithium solution containing lithium by 200 mg/L or more and fluorine by 20 mg/L or more. The lithium solution may be appropriately provided for use.

The concentration of lithium in the lithium solution is 200 mg/L or more and preferably 400 mg/L or more.

The concentration of fluorine in the lithium solution is 20 mg/L or more, and may be 100 mg/L or more and may be 300 mg/L or more.

The concentration of lithium in the lithium solution can be measured through ICP-AES using, for example, ICAP 6300DuO (obtained from Thermo Fisher Scientific K.K.).

The concentration of fluorine in the lithium solution can be measured with, for example, a device including an IM-32P glass electrode-type hydrogen ion indicator (obtained from DKK-TOA CORPORATION) and an F-2021 fluoride ion electrode (obtained from DKK-TOA CORPORATION) connected to the indicator.

The pH (hydrogen-ion exponent) of the lithium solution is preferably 10.5 or higher but 12.5 or lower and more preferably 10.5 or higher but 12.0 or lower.

The lithium solution having a pH adjusted to 10.5 or higher can reduce the amount of the alkali added to increase the pH of the lithium solution after the addition of the first component for increasing the efficiencies of the first removal step and the second removal step, and at the same time can reduce the dissolved amount of the fed first component (e.g., calcium) after the first removal step. As a result, the first component can be separated as a carbonate salt with a less amount of the second component. Also, the fed second component can be absorbed or dissolved in the solution with higher efficiency, to reduce the amount of the second component to be added.

The lithium solution having a pH adjusted to 12.5 or lower allows the first component to be easily dissolved therein, to increase the removal rate of fluorine.

<Lithium Solution Preparation Step>

As described above, the present invention can treat an appropriately provided lithium solution. Instead, the present invention can use, for example, a lithium solution prepared in the lithium solution preparation step.

The lithium solution preparation step is a step of treating a lithium ion secondary battery before the first removal step, to obtain (prepare) the lithium solution.

A method for treating the lithium ion secondary battery in the lithium solution preparation step is not particularly limited and may be appropriately selected depending on the intended purpose. In a preferable method, a thermal treatment of heating the lithium ion secondary battery is performed and then lithium in the lithium ion secondary battery is allowed to leach into water.

The method for treating the lithium ion secondary battery preferably includes, for example, a thermal treatment step, a pulverization step, a classification step, and a leaching step.

<<Thermal Treatment Step>>

The thermal treatment step is a step of thermally treating (roasting) the lithium ion secondary battery.

-Lithium Ion Secondary Battery-

The lithium ion secondary battery is not particularly limited and may be appropriately selected depending on the intended purpose. Examples thereof include: defective lithium ion secondary batteries occurring in the course of production of lithium ion secondary batteries; lithium ion secondary batteries to be discarded due to, for example, failures and exhausted lifetimes of devices in which they are being used; and used lithium ion secondary batteries to be discarded due to running out of the lifetimes thereof.

The shape, structure, size, and material of the lithium ion secondary battery are not particularly limited and may be appropriately selected depending on the intended purpose.

The shape of the lithium ion secondary battery is not particularly limited and may be appropriately selected depending on the intended purpose. Examples thereof include a laminate, a cylinder, a button, a coin, a rectangle, and a plane.

Examples of the lithium ion secondary battery include those including a positive electrode, a negative electrode, a separator, an electrolyte solution containing an electrolyte and an organic solvent, and an external housing; i.e., a battery casing that houses the positive electrode, the negative electrode, the separator, and the electrolyte solution. The lithium ion secondary battery may be in a state without, for example, the positive electrode and the negative electrode.

The form of the lithium ion secondary battery is not particularly limited and may be appropriately selected depending on the intended purpose. Examples thereof include a battery cell, a battery module, and a battery pack. Here, the battery module refers to a single casing enclosing a plurality of battery cells (unit cells) that are connected together, and the battery pack refers to a single casing enclosing a plurality of battery modules. The battery pack may include a controller and a cooling device.

--Positive Electrode--

The positive electrode is not particularly limited as long as it contains a positive electrode active material, and may be appropriately selected depending on the intended purpose.

The shape of the positive electrode is not particularly limited and may be appropriately selected depending on the intended purpose. Examples thereof include a flat plate and a sheet.

---Positive Electrode Collector---

The shape, structure, size, material, etc. of the positive electrode collector are not particularly limited and may be appropriately selected depending on the intended purpose.

Examples of the shape of the positive electrode collector include a foil.

Examples of the material of the positive electrode collector include stainless steel, nickel, aluminum, copper, titanium, and tantalum. Of these, aluminum is preferable.

The positive electrode material is not particularly limited and may be appropriately selected depending on the intended purpose. One example of the positive electrode material contains a positive electrode active material containing lithium, and if necessary contains a conductive agent and a binder resin.

Examples of the positive electrode active material include lithium manganese oxide ($LiMn_2O_4$), lithium cobalt oxide ($LiCoO_2$), lithium nickel cobalt oxide ($LiCo_{1/2}Ni_{1/2}O_2$), $LiNi_xCo_yMn_zO_2$ (x+y+z=1) referred to as, for example, a ternary system or an NCM system, $LiNi_xCo_yAl_z$ (x+y+z=1) referred to as, for example, an NCA system, lithium iron phosphate ($LiFePO_4$), and lithium titanate ($Li_2TiO_3$). Of these, lithium manganese oxide, lithium cobalt oxide, lithium nickel cobalt oxide ($LiCo_{1/2}Ni_{1/2}O_2$), $LiNi_xCo_yMn_zO_2$ (x+y+z=1) referred to as, for example, a ternary system or an NCM system, and $LiNi_xCo_yAl_z$ (x+y+z=1) referred to as, for example, an NCA system are suitable because they easily change the lithium to a water-suitable form through the thermal treatment.

The conductive agent is not particularly limited and may be appropriately selected depending on the intended purpose. Examples thereof include carbon black, graphite, carbon fibers, and metal carbides.

The binder resin is not particularly limited and may be appropriately selected depending on the intended purpose. Examples thereof include: homopolymers and copolymers of, for example, vinylidene fluoride, tetrafluoroethylene, acrylonitrile, and ethylene oxide; and styrene-butadiene rubber.

--Negative Electrode--

The negative electrode is not particularly limited as long as it contains a negative electrode active material, and may be appropriately selected depending on the intended purpose.

The shape of the negative electrode is not particularly limited and may be appropriately selected depending on the intended purpose. Examples thereof include a flat plane and a sheet.

---Negative Electrode Collector---

The shape, structure, size, material, etc. of the negative electrode collector are not particularly limited and may be appropriately selected depending on the intended purpose.

Examples of the shape of the negative electrode collector include a foil.

Examples of the material of the negative electrode collector include stainless steel, nickel, aluminum, copper, titanium, and tantalum. Of these, copper is preferable.

The negative electrode material is not particularly limited and may be appropriately selected depending on the intended purpose. Examples thereof include carbon materials such as graphite and hard carbon, and titanates.

The temperature in the thermal treatment (the thermal treatment temperature) is preferably 750° C. or higher, more preferably 750° C. or higher but 1,080° C. or lower, and particularly preferably 750° C. or higher but 900° C. or lower. When the thermal treatment temperature is adjusted to 750° C. or higher, lithium in $Li(Ni/Co/Mn)O_2$ contained in the positive electrode active material and in $LiPF_6$ contained in the electrolyte can be formed into a substance containing lithium that is soluble in an aqueous solution, such as lithium fluoride (LiF), lithium carbonate ($Li_2CO_3$), and lithium oxide ($Li_2O$).

The thermal treatment temperature refers to a temperature of the lithium ion secondary battery during the thermal treatment. The thermal treatment temperature can be measured by inserting a thermometer such as a couple or a thermistor into the lithium ion secondary battery at the thermal treatment temperature.

The external housing of the lithium ion secondary battery preferably uses a material having a melting point higher than the thermal treatment temperature. When thermally treating a lithium ion secondary battery provided with the external housing formed of a material having a melting point higher than the thermal treatment temperature, the external housing maintains to hermetically close the interior of the battery during the thermal treatment. The presence of carbon (the negative electrode active material) allows the interior of the battery to be maintained in a low-oxygen atmosphere having an oxygen concentration of 11% or lower. The thermal treatment in an environment having a low oxygen concentration can promote decomposition of the positive electrode active material to increase lithium of a soluble form. This can increase a leaching rate (recovery rate) of lithium into the lithium solution.

When the external housing of a lithium ion secondary battery is formed of a material having a melting point lower than the thermal treatment temperature, the thermal treatment is preferably performed in a low-oxygen atmosphere having an oxygen concentration of 11% or lower. Alternatively, the thermal treatment is preferably performed so that the oxygen concentration becomes 11 vol % or lower in the lithium ion secondary battery at least during roasting (in particular, the positive electrode collector and the negative electrode collector that are disposed in the external housing of the lithium ion secondary battery).

An exemplary possible method for achieving the low-oxygen atmosphere is accommodating the lithium ion secondary battery, the positive electrode, or the negative electrode in an oxygen-shielding container, followed by the thermal treatment. A material of the oxygen-shielding container is not particularly limited as long as it is a material having a melting point equal to or higher than the thermal treatment temperature, and may be appropriately selected depending on the intended purpose. For example, when the thermal treatment temperature is 800° C., examples of the material of the oxygen-shielding container include iron and stainless steel each having a melting point higher than the indicated thermal treatment temperature.

The oxygen-shielding container is preferably provided with an opening for releasing a gas pressure during combustion of the electrolyte solution in the lithium ion battery or laminate. The opening area of the opening is preferably determined so as to be 12.5% or smaller relative to the surface area of the external housing in which the opening is provided. The opening area of the opening is more preferably 6.3% or smaller relative to the surface area of the external housing in which the opening is provided. The shape, size, position, etc. of the opening are not particularly limited and may be appropriately selected depending on the intended purpose.

The period for which the lithium ion secondary battery is thermally treated (the thermal treatment period) is not particularly limited and may be appropriately selected depending on the intended purpose. It is preferably 1 minute or longer but 5 hours or shorter and more preferably 1 minute or longer but 2 hours or shorter. The thermal treatment period may be any period as long as the lithium-containing compound can reach a desired temperature. Decreasing the heating rate prevents formation of an insoluble oxide of lithium, which makes it possible to increase the leaching rate of lithium. The period for which the temperature is maintained after heating may be short.

The preferable thermal treatment period is advantageous in terms of the cost for the thermal treatment and the productivity when preparing the lithium solution.

A method of the thermal treatment is not particularly limited and may be appropriately selected depending on the intended purpose. Examples thereof include a method using a roasting furnace.

The roasting furnace is not particularly limited and may be appropriately selected depending on the intended purpose. Examples thereof include batch-type furnaces such as a rotary kiln, a fluidized bed furnace, a tunnel kiln, and a muffle furnace; a cupola, and a stoker furnace.

An atmosphere used for the thermal treatment is not particularly limited and may be appropriately selected depending on the intended purpose. Examples of the atmosphere include the atmosphere, an inert atmosphere, a reducible atmosphere, and a low-oxygen atmosphere. The atmosphere used for the thermal treatment is preferably an atmosphere that can maintain the interior of the lithium ion secondary battery to have a low-oxygen concentration during the thermal treatment. Examples of such an atmosphere include the atmosphere, an inert atmosphere, a reducible atmosphere, and a low-oxygen atmosphere, as described above.

The atmosphere refers to an atmosphere using air.

The inert atmosphere is, for example, an atmosphere of nitrogen or argon.

The reducible atmosphere refers to, for example, an atmosphere containing $CO$, $H_2$, $H_2S$, $SO_2$, etc. in the inert atmosphere of nitrogen, argon, etc.

The low-oxygen atmosphere refers to an atmosphere having a partial pressure of oxygen of 11% or lower.

<<Pulverization Step>>

The pulverization step is not particularly limited as long as it is a step of pulverizing the lithium ion secondary battery having undergone the thermal treatment in the thermal treatment step (the roasted product) to obtain a pulverized product, and may be appropriately selected depending on the intended purpose. Preferably, the pulverization step is, for example, a step of pulverizing the roasted product with an impact to obtain a pulverized product. When the external housing of the lithium ion secondary battery is not melted during the thermal treatment, more preferably, the roasted product is preliminarily pulverized by being cut with a cutting machine before giving an impact to the roasted product.

Examples of a method for performing pulverization with an impact include a method of giving an impact to the roasted product by flying the roasted product with a rotating striking plate to an impact plate, and a method of hitting the roasted product with a rotating striker (beater). This method can be performed with, for example, a hammer crusher. Further examples of a method for performing pulverization with an impact include a method of hitting the roasted product with balls of, for example, ceramics. This method can be performed with, for example, a ball mill. The pulverization with an impact can also be performed with, for example, a biaxial pulverizer with blades each having a short blade width and length and configured to perform pulverization through compression.

The period of the pulverization in the pulverization step is not particularly limited and may be appropriately selected depending on the intended purpose. The period of the pulverization per 1 kg of the lithium ion secondary battery is preferably 1 second or longer but 30 minutes or shorter, more preferably 2 seconds or longer but 10 minutes or shorter, and particularly preferably 3 seconds or longer but 5 minutes or shorter.

<<Classification Step>>

The classification step is not particularly limited as long as it is a step of classifying the pulverized product to sort it to a coarsely granulated product and a minutely granulated product to obtain recovered products therein, and may be appropriately selected depending on the intended purpose.

A method of the classification is not particularly limited and may be appropriately selected depending on the intended purpose. The classification can be performed with, for example, a vibrating screen, a multi-step vibrating screen, a cyclone, or a standard screen in JIS Z8801. The classification can separate copper, iron, aluminum, etc. into the coarsely granulated product and concentrate lithium in the minutely granulated product.

Granularity in the classification is not particularly limited and may be appropriately selected depending on the intended purpose. It is preferably 0.6 mm or more but 2.4 mm or less and more preferably 0.85 mm or more but 1.7 mm or less. When the granularity in the classification is 2.4 mm or less, impurities such as copper, iron, and aluminum can be prevented from inclusion in the minutely granulated product, which makes it possible to increase the amount of lithium recovered per unit weight when leaching the minutely granulated product. When the granularity in the classification is 0.6 mm or more, recovery of lithium into the coarsely granulated product can be prevented, which makes it possible to increase the amount of lithium recovered when leaching the minutely granulated product.

The classification into the coarsely granulated product and the minutely granulated product may be repeated twice or more. This repeated classification can further reduce the impurity content of each product.

<<Leaching Step>>

The leaching step is not particularly limited as long as it is a step of leaching lithium to liquid from the lithium ion secondary battery having undergone the thermal treatment, and may be appropriately selected depending on the intended purpose.

In the leaching step, for example, it is preferable to leach the minutely granulated product of the lithium ion secondary battery recovered in the classification step.

The liquid to which lithium is leached in the leaching step is not particularly limited and may be appropriately selected depending on the intended purpose.

The liquid is preferably water. Leaching lithium to water in the leaching step enables impurities such as nickel (Ni), cobalt (Co), and manganese (Mn) to be almost completely (100%) recovered as the residue. Thus, when leaching lithium to water, preferably, the lithium-leached water in the form of a slurry is separated between solid and liquid with, for example, filter paper or a solid-liquid separator, to recover the residue such as nickel, cobalt, and manganese. In other words, in the leaching step in the lithium solution preparation step, the residue such as nickel, cobalt, and manganese is preferably removed through solid-liquid separation.

The water is not particularly limited and may be appropriately selected depending on the intended purpose. Examples thereof include industrial water, tap water, pure water such as ion-exchanged water, ultrafiltration water, reverse osmosis water, and distilled water, and ultrapure water.

A method for leaching lithium in the leaching step is not particularly limited and may be appropriately selected depending on the intended purpose. In one possible example of the method, the minutely granulated product of the lithium ion secondary battery recovered in the classification step is charged to liquid, followed by stirring, to leach lithium to the liquid. The stirring speed of the liquid in the leaching step is not particularly limited and may be appropriately selected depending on the intended purpose. The stirring speed may be, for example, 200 rpm.

The leaching period in the leaching step is not particularly limited and may be appropriately selected depending on the intended purpose. The leaching period may be, for example, 1 hour.

In this way, for example, the thermal treatment step, the pulverization step, the classification step, and the leaching step can be performed to treat the lithium ion secondary battery, to prepare the lithium solution.

Further, as described above, when the thermal treatment of heating the lithium ion secondary battery is followed by leaching lithium in the lithium ion secondary battery to water to prepare the lithium solution, the prepared lithium solution is substantially free from impurities such as nickel (Ni), cobalt (Co), and manganese (Mn). This makes it possible to obtain lithium of a higher purity (content) in a simple manner.

<First Removal Step>

The first removal step is a step of adding the first component, which solidifies the fluorine contained in the lithium solution, to the lithium solution and removing the fluorine solidified to obtain the F-removed liquid.

Solidifying the fluorine in the first removal step refers to solidifying the fluorine so as to be removable from the lithium solution. Thus, for example, when removing the fluorine from the lithium solution through solid-liquid separation, the fluorine may be solidified so as to be separable through solid-liquid separation. In this case, for example, the solidified fluorine may be minute particles or may be a precipitate (a sediment) with a certain size.

The F-removed liquid (the fluorine-removed liquid) refers to a liquid obtained by adding the first component to the lithium solution and removing the solidified fluorine.

-First Component-

The first component is not particularly limited as long as it is a component capable of solidifying fluorine, and may be appropriately selected depending on the intended purpose. Examples of the first component include calcium (calcium ion; $Ca^{2+}$), aluminum (aluminum ion; $Al^{3+}$), magnesium (magnesium ion; $Mg^{2+}$), cerium (cerium ion; $Ce^{2+}$), phosphorus (phosphate ion; $PO_4^{3-}$ and phosphite ion ($HPO_4^{2-}$), and hypophosphite ion ($H_2PO_4^-$). Of these, calcium (calcium ion) is suitable in terms of, for example, the efficiency in solidification of fluorine, and easiness in removal in the second removal step.

When adding the first component to the lithium solution, the first component may be directly added thereto or may be added as, for example, a compound containing the first component.

When directly adding the first component, for example, a solid formed of the first component may be added to the lithium solution or a solution containing the first component dissolved therein may be added to the lithium solution.

When adding the compound containing the first component, for example, a solid containing the first component-containing compound may be added to the lithium solution or a solution containing the first component-containing compound dissolved therein may be added to the lithium solution.

Of these, a method of adding the solution containing the first component or the compound containing the first component dissolved therein is suitable in terms of removal efficiency of the fluorine. When adding the solution containing the first component or the first component-containing compound dissolved therein, the first component can be ionized before added to the lithium solution, to increase reaction efficiency with fluorine.

In other words, adding the solution can prevent the following disadvantages which would occur when adding the solid. Specifically, adding the solution can prevent reaction between the components dissolved in the lithium solution such as carbonate ion ($CO_3^{2-}$) and the solid surface containing the first component, and formation of a non-fluorine reaction phase on the solid surface as a result. For example, when adding slaked lime as a solid, the surface of the slaked lime reacts with carbonate ions ($CO_3^{2-}$) dissolved in the lithium solution to form a calcium carbonate phase, resulting in a decrease in the removal efficiency of the fluorine.

Examples of the compound containing the first component include calcium hydroxide ($Ca(OH)_2$; slaked lime), calcium carbonate, calcium oxide, calcium aluminate, and calcium phosphate. Of these, calcium hydroxide is suitable in terms of, for example, the efficiency in solidification of fluorine, and easiness in removal in the second removal step. In other words, in the first removal step, calcium hydroxide containing calcium is preferably added as the first component to the lithium solution. Use of an aluminum compound (e.g., aluminum sulfate, calcium aluminate, aluminum chloride, or aluminum hydroxide) as the first component in addition to the calcium compound can further reduce the amount of fluorine as compared with the case of using a calcium compound alone. For example, the concentration of fluorine in the F-removed liquid can be reduced to a level lower than 10 mg/L. Also, aluminum leached during leaching of lithium is allowed to co-precipitate at the time of solidification of fluorine; i.e., this aluminum can be used as a fluorine remover while being removed.

The amount of the first component added relative to the total amount of the lithium solution is not particularly limited and may be appropriately selected depending on the intended purpose. When the lithium solution contains carbonate ions, the first component is consumed through reaction with the carbonate ions, and thus the amount of the first component added is preferably increased. From the viewpoint of stably solidifying and separating fluorine, the amount of the first component increased is preferably such an amount that the first component can react with both the fluorine and the carbonate ions contained in the lithium solution when the total amount of the fluorine and the carbonate ions contained in the lithium solution is the fluorine by X mole (mol) and the carbonate ions by Y mole (mol).

The amount of the first component added relative to the fluorine by X mole (mol) and the carbonate ions by Y mole (mol) in the lithium solution can be, for example, $0.5 \times (X+2Y)$ mol or more but $10 \times (X+2Y)$ mol or less when the ion of the first component is divalent. More preferably, the amount of the first component added relative to the fluorine by X mole (mol) and the carbonate ions by Y mole (mol) in the lithium solution can be, for example, $0.75(X+2Y)$ mol or more but $5(X+2Y)$ mol or less.

For example, when calcium hydroxide (a calcium ion is divalent) is used as the compound containing the first component, the amount of the calcium hydroxide added relative to the fluorine by X mole (mol) and the carbonate ions by Y mole (mol) in the lithium solution is preferably $0.5 \times (X+2Y)$ mol or more but $10 \times (X+2Y)$ mol or less and more preferably $0.75 \times (X+2Y)$ mol or more but $5 \times (X+2Y)$ mol or less.

In the first removal step, the lithium solution is preferably stirred after the addition of the first component.

The stirring speed of the lithium solution in first removal step is not particularly limited and may be appropriately selected depending on the intended purpose. For example, the stirring speed is preferably 20 rpm or more but 2000 rpm or less and more preferably 50 rpm or more but 1000 rpm or less.

The stirring period of the lithium solution in the first removal step is not particularly limited and may be appropriately selected depending on the intended purpose. For example, the stirring period is preferably 5 minutes or longer but 240 minutes shorter and more preferably 15 minutes or longer but 120 minutes or shorter. The stirring period (the reaction time) that is 240 minutes or shorter can prevent the solidified fluorine from re-dissolution.

A method for removing the solidified fluorine in the first removal step is not particularly limited and may be appropriately selected depending on the intended purpose. Examples of the method include a method using solid-liquid separation and a method of removing a precipitate (a sediment) formed of the solidified fluorine. Of these, the method for removing the solidified fluorine in the first removal step is preferably a method using solid-liquid separation. In other words, in the first removal step, the solidified fluorine is preferably removed through solid-liquid separation. When the solidified fluorine is removed through solid-liquid separation, the fluorine can be removed from the lithium solution with higher separation performance.

The removal of the solidified fluorine through solid-liquid separation can be performed by, for example, filtrating the lithium solution (which may be in the form of a slurry) using, for example, filter paper or a solid-liquid separator.

The filter paper used for the removal of the solidified fluorine through solid-liquid separation is not particularly limited and may be appropriately selected depending on the intended purpose. Quantitative filter paper is preferably used. More preferably, filter paper classified into 5C in JIS P3801 is used.

The solid-liquid separator used for the removal of the solidified fluorine through solid-liquid separation is not particularly limited and may be appropriately selected depending on the intended purpose. Examples thereof include a screw press, a roller press, a belt screen, a vibrating screen, a multi-plate wave filter, a vacuum dehydrator, a pressure dehydrator (a filter press), a belt press, a screw press, a centrifugal dehydrator (a screw decanter), and a multi-disc dehydrator.

Now, one exemplary preferable embodiment in which a calcium compound is added as the first component will be described.

In one embodiment of the present invention, the pH of the lithium solution can be adjusted to 10.5 or higher by adjusting the lithium concentration when leaching lithium to water. This is likely because the lithium solution becomes a lithium hydroxide solution. Increasing the pH at the time of leaching can reduce the amount of an alkali added for increasing the pH after addition of calcium to 12 or higher. When the pH of the lithium solution after addition of calcium is lower than 12, it is preferable to additionally add an alkali to adjust the pH to 12 or higher.

Under this condition, in view of the solubility product of calcium, the amount of calcium ions ($Ca^{2+}$) dissolved in the F-removed liquid after the first removal step can be reduced to an amount less than 2,000 mg/L. This makes it possible to reduce the amount of the second component (e.g., carbon dioxide) for removing the calcium ions ($Ca^{2+}$) in the second removal step.

In addition, since the amount of the reaction product between calcium and the second component is small, it is possible to reduce the amount of lithium that co-precipitates during the reaction between calcium and the second component or that is entrained in water attached to the reaction product. Under this condition, moreover, the amount of the second component dissolved into the liquid is high, which makes it possible to reduce the amount of the second component used. The addition of the alkali may be performed in the first removal step or in the second removal step, or in both of the steps.

When slaked lime is used as the compound containing calcium, the addition of the calcium and the adjustment of the pH can be performed at the same time only by the addition of slaked lime.

Meanwhile, even under the condition that the amount of such calcium ions ($Ca^{2+}$) dissolved is small, the removal of fluorine can be sufficiently performed. For example, when the concentration of fluorine in the lithium solution before removal of the fluorine is 500 mg/L, the first removal step can be performed to reduce the concentration of fluorine in the lithium solution to about 20 mg/L.

A method for confirming the fluorine concentration of the F-removed liquid may be, for example, a method of measuring the fluorine concentration by the ion electrode method or ion chromatography. Also, reduction in the fluorine concentration may be simply determined by relying on ICP-AES to measure the calcium ion concentration or the aluminum ion concentration of the F-removed liquid.

For example, when calcium is contained in the lithium solution and the measurement of the calcium concentration of the F-removed liquid is 50 mg/L or more, it may be determined that the fluorine concentration could be reduced to about 20 mg/L. If the reduction in the fluorine concentration of the F-removed liquid is insufficient, calcium ions are consumed by fluorine and carbonate ions, and the concentration of calcium ions becomes less than 50 mg/L.

When aluminum is contained in the lithium solution and fluorine is reduced to about 20 mg/L, aluminum ions are co-precipitated with calcium ions and most of them are removed. When the aluminum concentration of the F-removed liquid is less than 1 mg/L, it may be determined that the fluorine concentration could be reduced to about 20 mg/L.

When carbonate ions are contained in the lithium solution by 500 mg/L or more and fluorine is reduced to about 20 mg/L, carbonate ions react with calcium ions and most of them are solidified. For example, when the concentration of carbonate ions is less than 50 mg/L by analyzing the F-removed liquid for the concentration of carbonate ions through, for example, inorganic carbon concentration analysis using a TOC (Total Organic Carbon) meter, it may be determined that the fluorine concentration could be reduced to about 20 mg/L. In the inorganic carbon concentration analysis using a TOC meter, the TOC is typically calculated from the calculation formula: "TC (total carbon)— IC (inorganic carbon)=TOC (organic carbon)", which makes it possible to measure the amount of IC (inorganic carbon). In a more specific example of the method for measuring the IC (inorganic carbon), a sample is injected into an IC reaction liquid (phosphoric acid) to be acidic, followed by a gas feeding treatment (the sample is acidified and fed with a carbon dioxide-free gas, to remove the inorganic carbon in the sample as carbon dioxide). The gas feeding treatment converts the only IC in the sample to carbon dioxide, and the amount of the carbon dioxide generated (the amount of the inorganic carbon) can be measured through NDIR (non dispersive infrared).

<Second Removal Step>

The second removal step is a step of adding the second component, which solidifies the first component remaining in the F-removed liquid, to the F-removed liquid and removing the first component solidified to obtain the first component-removed liquid.

Solidifying the second component in the second removal step refers to solidifying the second component so as to be removable from the lithium solution (the F-removed liquid). Thus, for example, when removing the second component from the lithium solution (the F-removed liquid) through solid-liquid separation, the second component may be solidified so as to be separable through solid-liquid separation. In this case, for example, the solidified second component may be minute particles or may be a precipitate (a sediment) with a certain size.

The first component-removed liquid refers to a liquid obtained by adding the second component to the F-removed liquid and removing the solidified first component.

The first component remaining in the F-removed liquid in the second treatment step is not limited to the first component added in the first removal step. For example, when the first component is initially contained in the lithium solution, the first component remaining in the F-removed liquid includes the first component that is initially contained in the lithium solution. That is, the first component remaining in the F-removed liquid refers to the first component contained in the F-removed liquid at the time that is after the first removal step but before the second removal step.

-Second Component-

The second component is not particularly limited as long as the second component is a component that can solidify the first component, and may be appropriately selected depending on the intended purpose. Carbon dioxide ($CO_2$) is preferable. When the second component is carbon dioxide, the first component can be easily removed as a carbonate salt. Rather than precipitating the lithium in the lithium solution as lithium carbonate, the first component (e.g., calcium) can be precipitated as a carbonate salt (e.g., calcium carbonate; $CaCO_3$) for selective removal. When the pH of the lithium solution is high (for example, 10.5 or higher), carbon dioxide can be efficiently absorbed or retained as $CO_3^{2-}$ ions in the lithium solution. The $CO_3^{2-}$ ions that have not contributed to removal of the second component in the second removal step can be effectively used as a component ($CO_3$) for the subsequent crystallization of the lithium carbonate.

A method for adding the second component to the lithium solution (the F-removed liquid) is not particularly limited and may be appropriately selected depending on the intended purpose. Examples of the method include a method of feeding (diffusing) a gas containing the second component to the lithium solution (the F-removed liquid) and a method of adding a solid formed of the second component to the lithium solution (the F-removed liquid). Of these, in terms of no need to add impurities to the solution, a method of feeding (diffusing) a gas containing the second component to the F-removed liquid is preferable.

When the second component is carbon dioxide, examples of the gas containing the second component include a carbon dioxide gas and air as a $CO_2$-containing gas. Of these, a carbon dioxide gas is preferable. In other words, in the second removal step, it is preferable to add a carbon dioxide gas containing carbon dioxide as the second component, to the lithium solution. This makes it possible to easily control the amount of carbon dioxide to be added to the lithium solution, and efficiently add carbon dioxide.

A method for feeding (diffusing) the second component-containing gas to the F-removed liquid is not particularly limited and may be appropriately selected depending on the intended purpose. For example, a diffuser (product name: Kerami filter type B, filter size φ (diameter) 25×20 mm, obtained from AS ONE Corporation) can be used. Feeding (diffusing) the second component-containing gas to the F-removed liquid can be performed with, for example, a known diffuser used in, for example, a water or sewage treatment plant, a waste water treatment plant, or a large purification tank. Alternatively, the feeding (diffusing) may be performed by feeding the second component-containing gas from a nozzle having a φ (diameter) of 1 mm or more and dispersing the gas with a stirring blade mounted to the top of this nozzle.

Feeding conditions for feeding (diffusing) the second component-containing gas to the F-removed liquid is not particularly limited and may be appropriately selected depending on the intended purpose. When a carbon dioxide gas is used as the second component-containing gas, for example, the carbon dioxide gas may be fed under conditions of 100 ml/min and 70 minutes.

In the second removal step, it is preferable to feed the second component so that, for example, the total amount of the first component remaining in the F-removed liquid becomes removal.

A method for removing the solidified first component in the second removal step is not particularly limited and may be appropriately selected depending on the intended purpose. Examples of the method include a method using solid-liquid separation and a method of removing a precipitate (a sediment) formed of the first component. Of these, the method for removing the solidified first component in the second removal step is preferably a method using solid-liquid separation. In other words, in the second removal step, the solidified first component is preferably removed through solid-liquid separation. When the solidified first component is removed through solid-liquid separation, the first component can be removed from the F-removed liquid with higher separation performance.

The removal of the solidified first component through solid-liquid separation can be performed by, for example, filtrating the F-removed liquid (which may be in the form of a slurry) using, for example, filter paper or a solid-liquid separator.

The filter paper used for the removal of the solidified first component through solid-liquid separation is not particularly limited and may be appropriately selected depending on the intended purpose. Quantitative filter paper is preferably used. More preferably, filter paper classified into 5C in JIS P3801 is used.

In the present invention, it is preferable to remove the solidified fluorine and the solidified first component in the first removal step and the second removal step. This makes it possible to remove the solidified fluorine and the solidified first component from the lithium solution with higher separation performance.

The removal from the lithium solution of the solidified fluorine and the solidified first component through solid-liquid separation may be performed collectively (at one time). When removing the residue such as nickel, cobalt, and manganese through solid-liquid separation when leaching lithium in water in the lithium solution preparation step, removal of the residue, the solidified fluorine, and the solidified first component through solid-liquid separation may be performed collectively (at one time).

The solid-liquid separation between the solidified fluorine and an unreacted portion of the compound containing the first component, and the solid-liquid separation of the solidified first component are more suitably performed in the respective removal steps. This is because it is possible to prevent the solidified fluorine from reacting with the second component, so that the fluorine re-dissolves, and it is possible to prevent reaction between the first component remaining in the solution and the second component, so that the second component is consumed.

<Lithium Concentration Step>

The lithium concentration step is a step, after the second removal step, of concentrating the lithium solution (the first component-removed liquid) to allow the lithium carbonate to be crystallizable. A method of the concentrating is not particularly limited and may be appropriately selected depending on the intended purpose. Examples of the method include concentration through evaporative concentration or membrane separation, and concentration in vacuum. Evaporative concentration is preferable. This is because it is possible to reduce the operation cost by using, for example, exhaust heat from factories, and it is possible to perform the below-described crystallization of the lithium carbonate by heat as well at the time of evaporative concentration, to make the process simple. It is desirable to concentrate lithium until the concentration of lithium in the liquid reaches 1500 mg/L or higher.

<Lithium Recovery Step>

The lithium recovery step is a step, after the second removal step, of warming (heating) the lithium solution (the first component-removed liquid) after or at the same time as the lithium concentration step, to recover lithium.

In the lithium recovery step, heating the first component-removed liquid to increase in the temperature thereof reduces the solubility of lithium in the first component-removed liquid. This makes it possible to precipitate undissolvable lithium as a lithium compound and recover lithium easily. For example, when carbon dioxide is added as the second component in second removal step, the first component-removed liquid is heated to effectively use a portion of the carbon dioxide added in the second removal step that has not contributed to solidification of the first component This makes it possible to precipitate lithium as lithium carbonate and recover lithium easily.

In the lithium recovery step, carbon dioxide may be added to promote precipitation of lithium carbonate. Also, the temperature of the lithium recovery step may be increased to the boiling point of the first component-removed liquid for evaporative concentration, to precipitate lithium carbonate. That is, the lithium concentration may be increased in the lithium concentration step to a level that is equal to or higher than the solubility of the lithium carbonate, to precipitate lithium carbonate, and this step may be performed as the lithium recovery step.

The precipitated lithium (lithium carbonate) can be recovered through, for example, solid-liquid separation of the lithium solution after precipitation of the lithium carbonate or use of a known tool such as a spoon, a rake, or a scraper. The lithium carbonate that has been recovered with, for example, a spoon, a rake, or a scraper can be allowed to undergo solid-liquid separation to reduce attached water. This makes it possible to reduce the impurity content of the lithium carbonate.

A method for warming (heating) the lithium solution (the first component-removed liquid) is not particularly limited and may be appropriately selected depending on the intended purpose. Examples of the method include a method of heating the lithium solution having undergone the second removal step with a known heater.

The temperature of the lithium solution when heating the lithium solution is not particularly limited as long as lithium can be precipitated, and may be appropriately selected depending on the intended purpose. The temperature thereof is preferably 60° C. or higher but 105° C. or lower.

The concentration rate of the lithium solution (the first component-removed liquid) in the evaporative concentration of the lithium solution is not particularly limited and may be appropriately selected depending on the intended purpose. The concentration rate thereof is preferably 1.5 folds or higher but 70 folds or lower and more preferably 2 folds or higher but 35 folds or lower.

The temperature of the lithium solution in the evaporative concentration of the lithium solution is not particularly limited as long as the temperature thereof is a temperature at which the lithium solution can be evaporate, and may be appropriately selected depending on the intended purpose. For example, the temperature thereof is preferably 60° C. or higher but 105° C. or lower.

<Other Steps>

The other steps are not particularly limited and may be appropriately selected depending on the intended purpose.

First Embodiment

Figure 1:
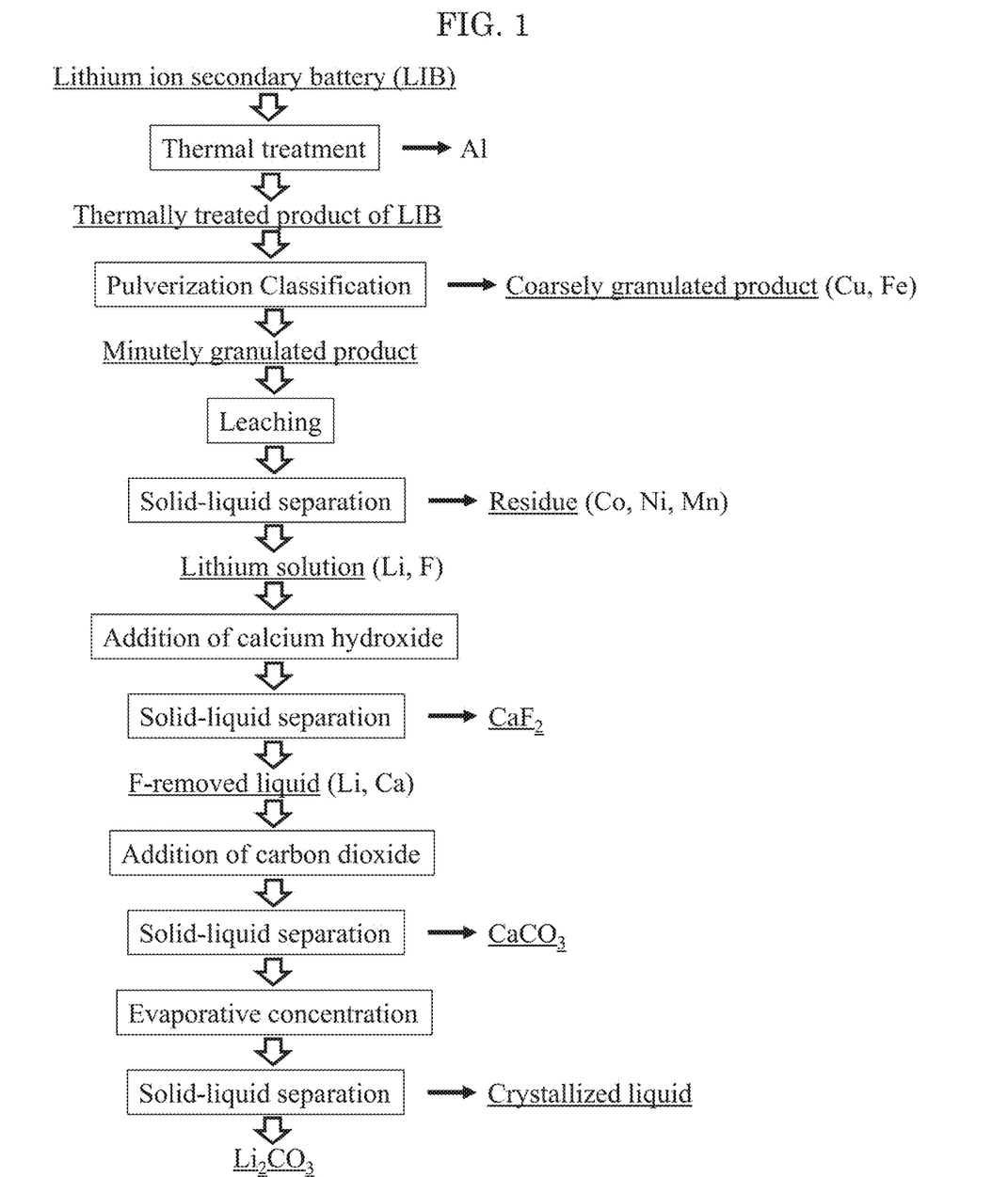
FIG. 1 is one example of a process flow in one embodiment of the method for separating lithium of the present invention.

Referring to the drawing, one exemplary embodiment of the method for separating lithium of the present invention will be described. FIG. 1 is one example of a process flow in one embodiment of the method for separating lithium of the present invention.

In this embodiment, first, a lithium ion secondary battery (LIB; Lithium Ion Battery) is subjected to a thermal treatment (the thermal treatment step) to obtain a thermally treated product of the LIB. This makes it possible to: form, for example, lithium in $Li(Ni/Co/Mn)O_2$ contained in the positive electrode active material and in $LiPF_6$ contained in the electrolyte into a substance containing lithium that is soluble in an aqueous solution, such as lithium fluoride (LiF), lithium carbonate ($Li_2CO_3$), and lithium oxide ($Li_2O$);

make nickel, cobalt, manganese, etc., separable; and fuse and separate aluminum (Al) in the LIB.

Next, in this embodiment, the thermally treated product of the LIB is pulverized and classified (the pulverization step and the classification step) to obtain a coarsely granulated product and a minutely granulated product. Such impurities as copper (Cu), iron (Fe), and aluminum (Al) can be separated as the coarsely granulated product and removed.

Subsequently, in this embodiment, lithium is leached to water from the minutely granulated product. At this time, the residue containing impurities; i.e., nickel (Ni), cobalt (Co), and manganese (Mn) is formed in the liquid to which lithium has been leached.

The residue containing nickel (Ni), cobalt (Co), and manganese (Mn) is removed through solid-liquid separation from the liquid to which lithium has been leached, to prepare a lithium solution.

Next, calcium hydroxide (slaked lime), which contains calcium, is added as the first component to the prepared lithium solution. This forms calcium fluoride ($CaF_2$), which is a fluorine compound between fluorine and calcium, in the lithium solution, to solidify the fluorine.

Subsequently, the calcium fluoride ($CaF_2$), which is the solidified fluorine, is removed through solid-liquid separation from the lithium solution (the first removal step).

Next, a carbon dioxide gas, which contains carbon dioxide ($CO_2$), is added as the second component to the lithium solution (the F-removed liquid) from which the solidified fluorine has been removed. This forms calcium carbonate ($CaCO_3$), which is a carbonate salt between calcium (Ca) as the first component and carbon dioxide as the second component, in the lithium solution, to solidify the calcium as the first component.

Subsequently, the calcium carbonate ($CaCO_3$), which is the solidified first component, is removed through solid-liquid separation from the lithium solution (the second removal step).

The lithium solution, from which the solidified first component; i.e., calcium carbonate has been removed, is warmed to undergo evaporative concentration, to recover lithium as lithium carbonate ($Li_2CO_3$). At this time, in the first embodiment, it is preferable to separate the lithium solution having undergone evaporative concentration into the lithium carbonate and the crystallized liquid through solid-liquid separation.

In this embodiment, lithium and fluorine are separated from the lithium solution obtained by treating the lithium ion secondary battery, and the lithium is recovered as lithium carbonate from the lithium solution having undergone the separation, so that the lithium carbonate of a high purity (content) with less fluorine can be obtained in a simple manner.

The crystallized liquid (the liquid after crystallization) from which the lithium carbonate has been recovered contains lithium and fluorine. When this liquid is subjected repeatedly to the liquid washing process following the first removal step, the recovery rate of lithium can be further increased. That is, in the method for separating lithium of the present invention, the crystallized liquid obtained by recovering the lithium carbonate through evaporative concentration of the first component-removed liquid is preferably added again to the lithium solution in the first removal step.

Second Embodiment

Figure 2:
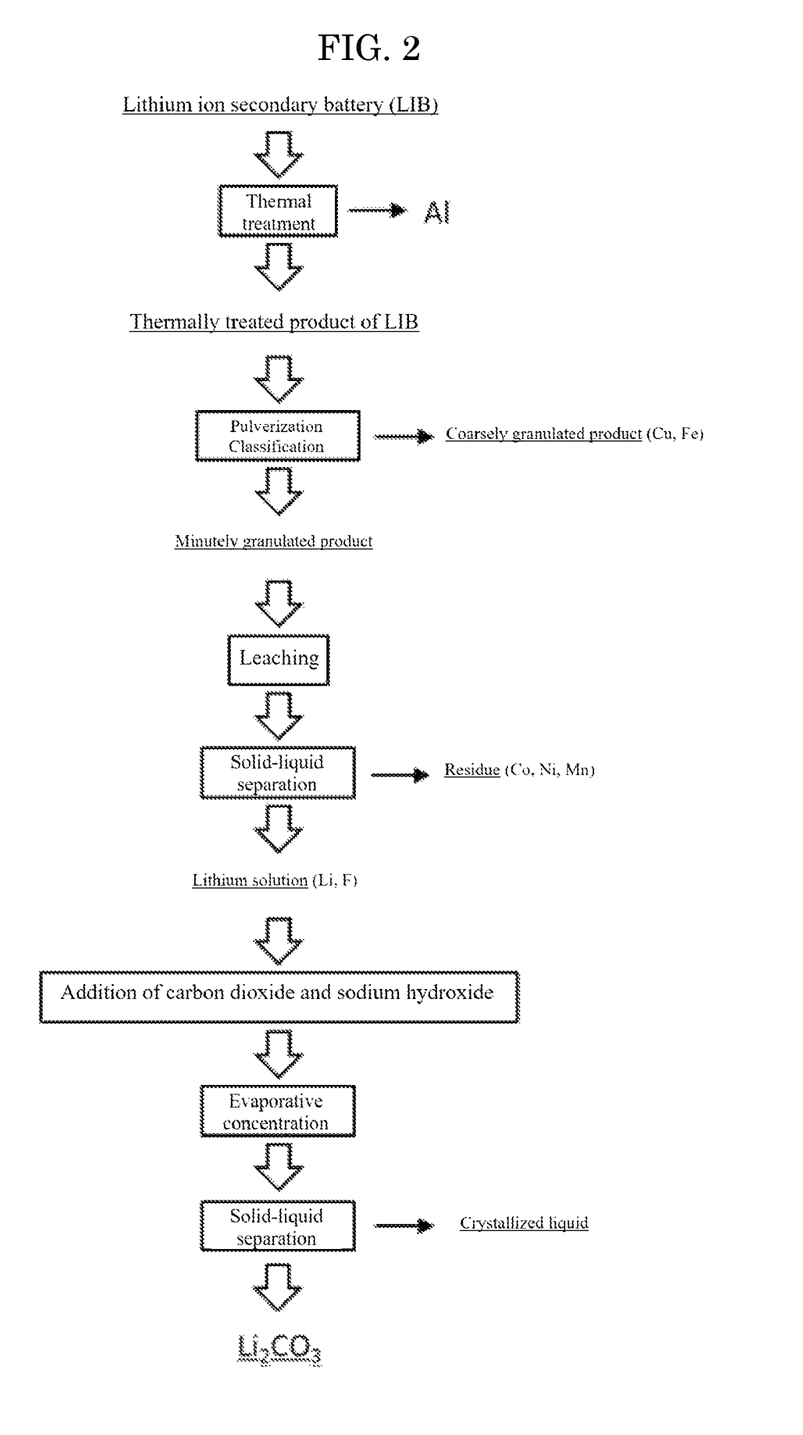
FIG. 2 is one example of a process flow in another embodiment of the method for separating lithium of the present invention.

FIG. 2 is one example of a process flow in another embodiment of the method for separating lithium of the present invention.

The second embodiment is the same as the above first embodiment in the following process: i.e., thermally treating the lithium ion secondary battery to obtain the thermally treated product of the LIB, pulverizing and classifying the thermally treated product of the LIB into the coarsely granulated product and the minutely granulated product, leaching lithium to water from the minutely granulated product, and removing the residue from the liquid to which lithium has been leached to prepare the lithium solution.

Next, a carbon dioxide gas, which contains carbon dioxide, and a sodium hydroxide solution as an alkali for preventing the pH from decreasing due to the carbon dioxide fed are added to the prepared lithium solution. The resultant lithium solution contains lithium carbonate and fluorine.

Feeding carbon dioxide is preferably performed by bubbling the carbon dioxide gas. That is, in the second embodiment, carbon dioxide is preferably added by bubbling the carbon dioxide gas. The concentration of carbonate ions of the lithium solution to which carbon dioxide has been fed is preferably 3000 mg/L or higher and more preferably 6000 mg/L or higher.

In the second embodiment, the pH of the lithium solution is preferably 10.5 or higher and more preferably 12.0 or higher. In the second embodiment, for example, when the pH of the lithium solution is initially 12.0 or higher, addition of the sodium hydroxide solution is optional.

Subsequently, in the second embodiment, the lithium solution, to which the carbon dioxide gas and the sodium hydroxide solution have been added, is warmed to precipitate lithium carbonate. In the second embodiment, the lithium solution, to which carbon dioxide has been added, is warmed to reduce the solubility of lithium carbonate, to precipitate the lithium carbonate. The temperature of the lithium solution during warming is preferably 60° C. or higher.

In the second embodiment, the lithium solution is further heated for evaporative concentration, to recover lithium as lithium carbonate ($Li_2CO_3$). That is, in the second embodiment, for example, lithium carbonate is precipitated through evaporative concentration of a solution containing carbonate ions dissolved. In the second embodiment, preferably, the lithium solution having undergone the evaporative concentration is separated between lithium carbonate and a crystallized liquid through solid-liquid separation.

Also, in the second embodiment, for example, when the lithium solution is warmed while being fed with a carbon dioxide gas, lithium carbonate can be precipitated at a heating temperature of about 60° C. without evaporative concentration.

In the second embodiment, carbon dioxide and sodium hydroxide are added to the lithium solution obtained by treating the lithium ion secondary battery, followed by warming, to recover lithium as lithium carbonate from the lithium solution, so that the lithium carbonate of a high purity (content) with less fluorine can be obtained in a simple manner.

That is, the method for separating lithium of the present invention is, in another aspect, a method for separating lithium from a lithium solution containing lithium by 200 mg/L or more and fluorine by 20 mg/L or more, the method including: a step of adding carbon dioxide to the lithium solution to obtain a solution in which carbonate ions are dissolved; and a step of warming the solution to precipitate lithium carbonate, followed by solid-liquid separation, to separate the lithium. By adding carbon dioxide to the lithium solution before evaporative concentration, the lithium carbonate precipitates more easily even if the fluorine is not removed from the lithium solution. The lithium carbonate precipitates preferentially to lithium fluoride, which makes it possible to obtain the lithium carbonate of a high purity (content) with less fluorine.

In the second embodiment, the method further includes a lithium solution preparation step of treating a lithium ion secondary battery containing at least one selected from the group consisting of cobalt, nickel, and manganese, to obtain a lithium solution. The lithium solution preparation step preferably includes: a thermal treatment step of heating the lithium ion secondary battery at 750° C. or higher; a classification step of pulverizing a thermally treated product of the lithium ion secondary battery, followed by classification in a range of from 0.6 to 2.4 mm; and a lithium leaching step of leaching with water a minutely granulated product recovered in the classification step. The lithium solution preparation step can be performed in the same manner as in the first embodiment.

EXAMPLES

The present invention will be described by way of Examples. However, the present invention should not be construed as being limited these Examples.

Example 1

<Preparation of Lithium Solution>

A lithium ion secondary battery (about 10 kg) containing cobalt, nickel, and manganese as positive electrode active materials was thermally treated using a muffle furnace (KBF66812-S, obtained from Koyo Thermo Systems Co., Ltd.) as a thermal treatment device under conditions that the thermal treatment temperature was 800° C. (to which the temperature was increased over 1 hour, and at which the indicated temperature was retained for 2 hours) and the flow rate of air fed was 5 L/min.

Then, using as a pulverizer a hammer crusher (MAKINO swing hammer crusher HC-20-3.7, obtained from MAKINO MFG., CO., LTD.), the lithium ion secondary battery having undergone the thermal treatment (the thermally treated product of the lithium ion secondary battery) was pulverized under conditions of 50 Hz (hammer circumferential speed: 38 m/s) and a 10 mm hole diameter of a punching metal at the exit, to obtain a pulverized product of the lithium ion secondary battery.

Subsequently, the pulverized product of the lithium ion secondary battery was screened using a screen having a mesh size of 1.2 mm (diameter: 200 mm, obtained from TOKYO SCREEN CO., LTD.) to obtain an oversized product (a coarsely granulated product) and an undersized product (a minutely granulated product) on the basis of 1.2 mm after the screening.

The obtained minutely granulated product was allowed to leach lithium to water under conditions of a leached liquid amount of 7.5 L, a solid-to-liquid ratio of 15%, a stirring speed of 200 rpm, and a leaching time of 1 hour. The water (slurry) to which lithium had been leached was separated into solid and liquid using filter paper classified into 5C (obtained from TOYO ROSHI KAISHA, Ltd.) to remove the residue containing nickel (Ni), cobalt (Co), and manganese (Mn), to prepare lithium solution 1.

The prepared lithium solution 1 was measured for the concentration of lithium through inductively coupled plasma atomic emission spectroscopy (ICP-AES) using ICAP 6300DuO (obtained from Thermo Fisher Scientific K.K.). The concentration of lithium was found to be 1540 mg/L.

The fluorine ion concentration thereof was measured with a device including an IM-32P glass electrode-type hydrogen ion indicator (obtained from DKK-TOA CORPORATION) and an F-2021 fluorine ion electrode (obtained from DKK-TOA CORPORATION) connected to the indicator. The concentration of fluorine was found to be 390 mg/L.

Also, the prepared lithium solution 1 was measured for pH with a pH meter, HM-25R (obtained from DKK-TOA CORPORATION). The pH was found to be 11.8.

<Removal of Fluorine>

For use in removing fluorine from the lithium solution 1, 25 g of solid calcium hydroxide (slaked lime) (obtained from FUJIFILM Wako Pure Chemical Corporation) was added to 0.5 L of ion-exchanged water, to prepare a slurry. This slurry was added to a 20 L-HDPE tank (cHD-20 white, obtained from AS ONE Corporation) containing 7.5 L of the lithium solution 1. The resultant mixture was stirred for 1 hour at 200 rpm using a MINISTAR40 stirring machine (obtained from IKA) at 200 rpm for 1 hour. The lithium solution 1, to which the slaked lime had been added and which had then been stirred, was separated into solid and liquid using filter paper classified into 5C (obtained from TOYO ROSHI KAISHA, Ltd.) to remove the solidified fluorine in the lithium solution 1 (obtain a F-removed liquid).

<Removal of Calcium>

Subsequently, a carbon dioxide ($CO_2$) gas was diffused to the lithium solution (F-removed liquid) 1, from which the solidified fluorine had been removed, using Kerami filter type B ($\varphi$10×180 mm filter size $\varphi$25×25 mm) (obtained from AS ONE Corporation) at 100 ml/min for 70 minutes, to precipitate calcium ($Ca^{2+}$ ions) remaining in the lithium solution 1 as calcium carbonate. This lithium solution 1, in which calcium carbonate had been precipitated, was separated into solid and liquid using filter paper classified into 5C (obtained from TOYO ROSHI KAISHA, Ltd.) to remove the solidified calcium (calcium carbonate) in the lithium solution 1 (obtain a first component-removed liquid).

<Recovery of Lithium Carbonate>

The lithium solution (first component-removed liquid) 1, from which the calcium carbonate had been removed, was added to a glass beaker. The lithium solution 1 was warmed to 95° C. with a hot magnetic stirrer (product name: C-MAG HS4 digital, obtained from IKA) located outside the beaker and 5-fold concentrated through evaporation. The precipitate after the evaporative concentration (lithium carbonate salt 1) was recovered with a stainless steel spoon. The filter paper classified into 5C (obtained from TOYO ROSHI KAISHA, Ltd.) was used for aspiration filtration to remove the extra water, to obtain the lithium carbonate salt 1 through solid-liquid separation.

<Evaluation>

The mass of the recovered lithium carbonate salt was measured using an electromagnetic scale (product name: GX-8K, obtained from A&D Company, Limited). Then, the lithium carbonate salt was dissolved under heating in aqua regia (obtained from FUJIFILM Wako Pure Chemical Corporation). The resultant solution was analyzed with an inductively coupled plasma atomic emission spectrometer (iCaP6300, obtained from Thermo Fisher Scientific K.K.) to determine the content ratios (contents) of lithium and various impurities. Results are presented in Table 1. In Table 1, the unit (%) means % by mass. Also, the proportion of lithium recovered in the recovered lithium carbonate relative to lithium contained in the initial solution (the lithium solution 1) was found to be 58%.

TABLE 1

| | | | | Contents | | | | | |
|---|---|---|---|---|---|---|---|---|---|
| Li (%) | C (%) | F (ppm) | P (ppm) | Al (ppm) | Cu (ppm) | Fe (ppm) | Co (ppm) | Ni (ppm) | Mn (ppm) |
| 18.5 | 16.2 | 400 | 19 | 17 | 0 | 0 | 0 | 0 | 0 |

Example 2

Lithium carbonate salt 2 was recovered in the same manner as in Example 1, except that the removal of the residue containing nickel (Ni), cobalt (Co), and manganese (Mn) at the time of preparation of the lithium solution, the removal of the solidified fluorine at the time of removal of fluorine, and the removal of the solidified calcium (calcium carbonate) at the time of removal of calcium; i.e., the filtrations before the addition of the $CO_2$ gas were performed collectively (at one time) and also the $CO_2$ gas was bubbled in the liquid at a flow rate of 100 ml/min for 70 minutes for the 5-fold evaporative concentration.

The evaluation was performed in the same manner as in Example 1. The proportion by mass of the amount of lithium in the recovered lithium carbonate salt 2 relative to the total amount of lithium contained in the above minutely granulated product was found to be 50%. In the same manner as in Example 1, the lithium carbonate salt 2 was determined for the content ratios (contents) of lithium and various impurities. Results are presented in Table 2.

TABLE 2

| | | | | Contents | | | | | |
|---|---|---|---|---|---|---|---|---|---|
| Li (%) | C (%) | F (ppm) | P (ppm) | Al (ppm) | Cu (ppm) | Fe (ppm) | Co (ppm) | Ni (ppm) | Mn (ppm) |
| 18.9 | 16.2 | 1,950 | 0 | 184 | 0 | 0 | 0 | 0 | 0 |

Example 3

Lithium carbonate salt 3 was recovered in the same manner as in Example 1, except that lithium solution 2 was prepared in the following manner and the evaporative concentration rate was changed to 38 folds. Specifically, the lithium solution 2 was prepared in the same manner as in the preparation of the lithium solution in Example 1, except that the leached liquid amount would be 56.5 L, the solid-to-liquid ratio would be 2%, the lithium concentration would be 200 mg/L, and the fluorine concentration would be 340 mg/L.

The evaluation was performed in the same manner as in Example 1. The proportion by mass of the amount of lithium in the recovered lithium carbonate salt 3 relative to the total amount of lithium contained in the above minutely granulated product was found to be 55%. In the same manner as in Example 1, the lithium carbonate salt 3 was determined for the content ratios (contents) of lithium and various impurities. Results are presented in Table 3.

TABLE 3

| | | | | Contents | | | | | |
|---|---|---|---|---|---|---|---|---|---|
| Li (%) | C (%) | F (ppm) | P (ppm) | Al (ppm) | Cu (ppm) | Fe (ppm) | Co (ppm) | Ni (ppm) | Mn (ppm) |
| 18.9 | 16.2 | 500 | 0 | 119 | 0 | 0 | 0 | 0 | 0 |

Example 4

Lithium carbonate salt 4 was recovered in the same manner as in Example 1, except that lithium solution 3 was prepared in the following manner and the evaporative concentration rate was changed to 21 folds. Specifically, the lithium solution 3 was prepared in the same manner as in the preparation of the lithium solution in Example 1, except that the lithium solution (the first component-removed liquid)

prepared in Example 2, from which the lithium carbonate had been removed, the lithium solution 2 prepared in Example 3, and the lithium solution (the first component-removed liquid) prepared in Example 3, from which the lithium carbonate had been removed, were mixed at a weight ratio of 2:1:12, to adjust the lithium concentration to 370 mg/L and the fluorine concentration to 33 mg/L.

The evaluation was performed in the same manner as in Example 1. The proportion by mass of the amount of lithium in the recovered lithium carbonate salt 4 relative to the total amount of lithium contained in the above minutely granulated product was found to be 54%. In the same manner as in Example 1, the lithium carbonate salt 4 was determined for the content ratios (contents) of lithium and various impurities. Results are presented in Table 4.

TABLE 4

| | | | | Contents | | | | | |
|---|---|---|---|---|---|---|---|---|---|
| Li (%) | C (%) | F (ppm) | P (ppm) | Al (ppm) | Cu (ppm) | Fe (ppm) | Co (ppm) | Ni (ppm) | Mn (ppm) |
| 18.8 | 16.0 | 1,920 | 0 | 32 | 0 | 0 | 0 | 0 | 0 |

Example 5

Lithium carbonate salt 5 was recovered in the same manner as in Example 1, except that the removal of fluorine (addition of calcium hydroxide, stirring of the lithium solution 1, and solid-liquid separation for removing the solidified fluorine) was not performed, and also the carbon dioxide ($CO_2$) gas was bubbled while adjusting the pH to 12 or higher by the addition of a 10% sodium hydroxide solution in a total of 100 ml to prevent the pH from decreasing, and the solid-liquid separation after bubbling the carbon dioxide gas was not performed (because of no need to recover calcium carbonate as a result of the absence of calcium hydroxide added in Example 1). More specifically, in Example 5, carbon dioxide was added to the lithium solution obtained by treating the lithium ion secondary battery. Then, the lithium solution was warmed to reduce the solubility of lithium carbonate, followed by evaporative concentration, to precipitate lithium carbonate. Then, the solid-liquid separation was performed to separate the lithium carbonate, to recover lithium as lithium carbonate 5.

The evaluation was performed in the same manner as in Example 1. The proportion by mass of the amount of lithium in the recovered lithium carbonate salt 5 relative to the total amount of lithium contained in the above minutely granulated product was found to be 61%. In the same manner as in Example 1, the lithium carbonate salt 5 was determined for the content ratios (contents) of lithium and various impurities. Results are presented in Table 5.

In Example 5, although fluorine had not been removed from the lithium solution, high-purity lithium carbonate having a fluorine content of less than 1000 ppm was obtained. This is likely because feeding carbon dioxide before the evaporative concentration made lithium carbonate precipitate more easily than in the below-described Comparative Example 1 in which no carbon dioxide was fed, and lithium carbonate precipitated preferentially to lithium fluoride.

The carbonate ion concentrations of the lithium solutions before the evaporative concentration of Comparative Example 1 and Example 5 were determined through inorganic carbon concentration analysis using a TOC meter (TOC-V CSH/CSN, obtained from Shimadzu Corporation). The carbonate ion concentration in Comparative Example 1 was found to be 1300 mg/L and the carbonate ion concentration in Example 5 was found to be 8600 mg/L.

Comparative Example 1

Lithium carbonate salt 6 was recovered in the same manner as in Example 1, except that the removal of fluorine, the addition of calcium hydroxide, the stirring of the lithium solution 1, the solid-liquid separation for removing the solidified fluorine, and the removal of calcium (the addition of the carbon dioxide gas and the solid-liquid separation for removing calcium carbonate) were not performed.

The evaluation was performed in the same manner as in Example 1. The proportion by mass of the amount of lithium in the recovered lithium carbonate salt 6 relative to the total amount of lithium contained in the above minutely granulated product was found to be 64%. In the same manner as in Example 1, the lithium carbonate salt 6 was determined for the content ratios (contents) of lithium and various impurities. Results are presented in Table 6.

TABLE 5

| | | | | Contents | | | | | |
|---|---|---|---|---|---|---|---|---|---|
| Li (%) | C (%) | F (ppm) | P (ppm) | Al (ppm) | Cu (ppm) | Fe (ppm) | Co (ppm) | Ni (ppm) | Mn (ppm) |
| 18.9 | 16.2 | 900 | 225 | 0 | 0 | 0 | 0 | 0 | 0 |

TABLE 6

| | | | | Contents | | | | | |
|---|---|---|---|---|---|---|---|---|---|
| Li (%) | C (%) | F (ppm) | P (ppm) | Al (ppm) | Cu (ppm) | Fe (ppm) | Co (ppm) | Ni (ppm) | Mn (ppm) |
| 18.7 | 16 | 12000 | 228 | 0 | 0 | 0 | 0 | 0 | 0 |

In Examples 1 to 5, which are working examples of the present invention, it has been found that lithium carbonate of a high purity (content) with less fluorine; i.e., less than 2000 ppm can be obtained in a simple manner by separating lithium and fluorine from the lithium solution obtained by treating the lithium ion secondary battery and recovering lithium as lithium carbonate from the lithium solution after the separation.

Table 7 presents measurements of the amounts (concentrations) of lithium and fluorine in the lithium solutions obtained in Examples 1 to 5 and Comparative Example 1, from which the solidified fluorine (calcium fluoride) and the solidified calcium (calcium carbonate) were removed.

It has been found from Table 7 that performing the first removal step and the second removal step; i.e., removing the solidified fluorine (calcium fluoride) and the solidified calcium (calcium carbonate) separate lithium and fluorine.

TABLE 7

| | | pH | Li (mg/l) | F (mg/l) | Al (mg/l) | Cu (mg/l) | Fe (mg/l) | Na (mg/l) | K (mg/l) | Ca (mg/l) | Mg (mg/l) | Co (mg/l) | Ni (mg/l) | Mn (mg/l) | P (mg/l) |
|---|---|---|---|---|---|---|---|---|---|---|---|---|---|---|---|
| Ex. 1 | Initial solution | 11.8 | 1,540 | 390 | 35 | N.D. | N.D. | 45 | N.D. | 3 | N.D. | N.D. | N.D. | N.D. | 3 |
| | After 1$^{st}$ removal step | 12.7 | 1,520 | 21 | N.D. | N.D. | N.D. | 44 | N.D. | 117 | N.D. | N.D. | N.D. | N.D. | N.D. |
| | After 2$^{nd}$ removal step | 12.5 | 1,490 | 22 | N.D. | N.D. | N.D. | 42 | N.D. | 1 | N.D. | N.D. | N.D. | N.D. | N.D. |
| Ex. 2 | Initial solution | 11.8 | 1,540 | 390 | 35 | N.D. | N.D. | 45 | N.D. | 3 | N.D. | N.D. | N.D. | N.D. | 3 |
| | After 1$^{st}$ removal step | 12.7 | 1,510 | 19 | N.D. | N.D. | N.D. | 43 | N.D. | 74 | N.D. | N.D. | N.D. | N.D. | N.D. |
| | After 2$^{nd}$ removal step | 12.6 | 1,500 | 54 | 15 | N.D. | N.D. | 42 | N.D. | 4 | N.D. | N.D. | N.D. | N.D. | N.D. |
| Ex. 3 | Initial solution | 11.1 | 200 | 340 | 21 | N.D. | N.D. | 7 | N.D. | 1 | N.D. | N.D. | N.D. | N.D. | 1 |
| | After 1$^{st}$ removal step | 13.0 | 200 | 4 | N.D. | N.D. | N.D. | 7 | N.D. | 166 | N.D. | N.D. | N.D. | N.D. | N.D. |
| | After 2$^{nd}$ removal step | 12.1 | 190 | 4 | N.D. | N.D. | N.D. | 8 | N.D. | 1 | N.D. | N.D. | N.D. | N.D. | N.D. |
| Ex. 4 | Initial solution | 12.4 | 370 | 33 | 5 | N.D. | N.D. | 13 | N.D. | N.D. | N.D. | N.D. | N.D. | N.D. | N.D. |
| | After 1$^{st}$ removal step | 12.7 | 360 | 18 | N.D. | N.D. | N.D. | 13 | N.D. | 139 | N.D. | N.D. | N.D. | N.D. | N.D. |
| | After 2$^{nd}$ removal step | 12.6 | 360 | 18 | 1 | N.D. | N.D. | 13 | N.D. | 1 | N.D. | N.D. | N.D. | N.D. | N.D. |
| Ex. 5 | Initial solution | 11.8 | 1,540 | 390 | 35 | N.D. | N.D. | 45 | N.D. | 3 | N.D. | N.D. | N.D. | N.D. | 3 |
| | After 1$^{st}$ removal step | | | | | | | | | | | | | | |
| | After 2$^{nd}$ removal step | 12.0 | 1,490 | 340 | 33 | N.D. | N.D. | 1,765 | N.D. | 1 | N.D. | N.D. | N.D. | N.D. | |
| Comp. Ex. 1 | Initial solution | 11.8 | 1,540 | 390 | 35 | N.D. | N.D. | 45 | N.D. | 3 | N.D. | N.D. | N.D. | N.D. | 3 |
| | After 1$^{st}$ removal step | | | | | | | | | | | | | | |
| | After 2$^{nd}$ removal step | | | | | | | | | | | | | | |

In Table 7, the "initial solution" refers to a lithium solution from which fluorine (calcium fluoride) and calcium (calcium carbonate) are not removed (a lithium solution obtained by treating the lithium ion secondary battery).

In Table 7, "N.D." stands for "Not Detected". In Table 7, "\ (backslash)" means that no analysis (measurement) was performed.

As described above, the method for separating lithium of the present invention is, for example, a method for separating lithium from a lithium solution containing lithium by 200 mg/L or more and fluorine by 20 mg/L or more, the method including: a first removal step of adding a first component, which solidifies the fluorine contained in the lithium solution, to the lithium solution and removing the fluorine solidified; and a second removal step of adding a second component, which solidifies the first component remaining in the lithium solution, to the lithium solution and removing the first component solidified.

Further, the method for separating lithium of the present invention is, for example, a method for separating lithium from a lithium solution containing lithium by 200 mg/L or more and fluorine by 20 mg/L or more, the method including: a step of adding carbon dioxide to the lithium solution to obtain a solution in which carbonate ions are dissolved and a step of warming the solution to precipitate lithium carbonate, followed by solid-liquid separation, to separate the lithium.

The methods for separating lithium of the present invention can separate lithium and fluorine, which is an impurity, from a lithium solution in a simple manner and with high separation performance.

The invention claimed is:

1. A method for separating lithium from a lithium solution containing lithium by 200 mg/L or more and fluorine by 20 mg/L or more, the method comprising:

treating a lithium ion secondary battery, the treating of the lithium ion secondary battery comprising: a thermal treatment of heating the lithium ion secondary battery to a temperature of 750° C. or higher to form a thermally treated product of the lithium ion secondary battery, and then leaching the lithium contained in the thermally treated product of the lithium ion secondary battery into water to obtain the lithium solution containing 200 mg/L or more of lithium and 20 mg/L or more of fluorine;

adding a first component, which solidifies the fluorine contained in the lithium solution, to the lithium solution and removing the fluorine solidified to obtain a F-removed liquid; and adding a second component, which solidifies the first component remaining in the F-removed liquid, to the F-removed liquid and removing the first component solidified to obtain a first component-removed liquid, wherein the second component is carbon dioxide, and prior to the addition of the first component and the second component, a pH of the lithium solution is adjusted to be in the range of from 10.5 to 12.5.

2. The method for separating lithium according to claim 1, wherein the first component is a calcium compound.

3. The method for separating lithium according to claim 1, wherein the first component is calcium hydroxide.

4. The method for separating lithium according to claim 1, wherein the carbon dioxide that is added as the second component is a carbon dioxide gas.

5. The method for separating lithium according to claim 1, wherein a pH of the F-removed liquid is 12 or higher.

6. The method for separating lithium according to claim 1, wherein the temperature in the thermal treatment of the lithium ion secondary battery is 750° C. or higher but 900° C. or lower, the thermal treatment occurs in roasting furnace having an atmosphere with an oxygen concentration of 11% or lower, and a duration of the thermal treatment 1 minute or longer but 5 hours or shorter.

7. The method for separating lithium according to claim 1, wherein the treating of the lithium ion secondary battery comprises pulverizing the thermally treated product of the lithium ion secondary battery to form a minutely granulated product of the lithium ion secondary battery, and the leaching comprises subjecting the minutely granulated product of the lithium ion secondary battery to leaching with water, where the minutely granulated product of the lithium ion secondary battery is recovered through classification in a range of 0.6 mm or more but 2.4 mm or less.

8. The method for separating lithium according to claim 1, wherein the lithium ion secondary battery contains at least one selected from the group consisting of cobalt, nickel, and manganese.

9. The method for separating lithium according to claim 1, wherein in the adding the first component and the adding the second component, the fluorine solidified and the first component solidified are removed through solid-liquid separation.

10. The method for separating lithium according to claim 1, further comprising after the adding the second component, warming the first component-removed liquid to recover lithium carbonate.

11. The method for separating lithium according to claim 10, wherein a temperature of the first component-removed liquid during the warming is adjusted to 60° C. or higher.

12. The method for separating lithium according to claim 10, wherein in the warming the first component-removed liquid, the first component-removed liquid is subjected to evaporative concentration to recover the lithium carbonate.

13. The method for separating lithium according to claim 12, wherein a residual liquid obtained by recovering the lithium carbonate through the evaporative concentration of the first component-removed liquid is added again to the lithium solution in the adding the first component.

14. The method for separating lithium according to claim 2, wherein in the adding the first component, an aluminum compound is added as the first component in addition to the calcium compound.

15. A method for separating lithium from a lithium solution containing lithium by 200 mg/L or more and fluorine by 20 mg/L or more, the method comprising:

adding carbon dioxide to the lithium solution to obtain a solution in which carbonate ions are dissolved; and warming the solution to precipitate lithium carbonate, followed by solid-liquid separation, to separate the lithium; wherein the lithium carbonate is precipitated from the solution without any prior removal of any of the 20 mg/L or more of fluorine that was initially present in the lithium solution.

16. The method for separating lithium according to claim 15, wherein a pH of the lithium solution is 10.5 or higher.

17. The method for separating lithium according to claim 15, wherein a pH of the lithium solution is 12.0 or higher.

18. The method for separating lithium according to claim 15, wherein the carbon dioxide is added by bubbling a carbon dioxide gas.

19. The method for separating lithium according to claim 15, wherein a temperature of the lithium solution during the warming is 60° C. or higher.

20. The method for separating lithium according to claim 15, wherein the lithium carbonate is precipitated through evaporative concentration of the solution in which the carbonate ions are dissolved.

21. The method for separating lithium according to claim 15, wherein in the adding the carbon dioxide, a concentration of the carbonate ions in the lithium solution after addition of the carbon dioxide is 3000 mg/L or higher.

22. The method for separating lithium according to claim 15, wherein in the adding the carbon dioxide, a concentration of the carbonate ions in the lithium solution after addition of the carbon dioxide is 6000 mg/L or higher.

23. The method for separating lithium according to claim 15, further comprising treating a lithium ion secondary battery containing at least one selected from the group consisting of cobalt, nickel, and manganese, to obtain the lithium solution, wherein the treating the lithium ion secondary battery includes:

heating the lithium ion secondary battery at 750° C. or higher;

pulverizing a thermally treated product of the lithium ion secondary battery, followed by classification in a range of 0.6 mm or more but 2.4 mm or less; and subjecting a minutely granulated product to leaching with water, where the minutely granulated product is recovered through the classification.

* * * * *